United States Patent

[11] 3,627,716

[72] Inventor Seymour Cohen
    Brooklyn, N.Y.
[21] Appl. No. 743,972
[22] Filed July 11, 1968
[45] Patented Dec. 14, 1971
[73] Assignee Argus Chemical Corporation
    Brooklyn, N.Y.

[54] POLYVINYL CHLORIDE RESIN STABILIZER COMBINATION COMPRISING A TETRAVALENT ORGANOTIN MERCAPTOCARBOXYLIC ACID COMPOUND AND A DIVALENT STANNOUS TIN SALT
25 Claims, No Drawings

[52] U.S. Cl. ........................................... 260/23 XA,
    252/400, 252/406, 252/407, 260/45.85, 260/45.75 K
[51] Int. Cl. ........................................... C08f 45/62
[50] Field of Search ............................. 260/45.75
    K, 45.85, 23 X; 252/400, 406, 407

[56] References Cited
UNITED STATES PATENTS

| | | | |
|---|---|---|---|
| 2,267,777 | 12/1941 | Yngve | 260/45.75 |
| 2,514,198 | 7/1950 | Hansen | 260/45.75 |
| 2,626,954 | 1/1953 | Albert | 260/45.75 |
| 2,629,700 | 2/1953 | Caldwell | 260/45.75 |
| 2,641,588 | 6/1953 | Leistner | 260/45.75 |
| 2,641,596 | 6/1953 | Leistner | 260/45.75 |
| 2,752,325 | 6/1956 | Leistner | 260/45.75 |
| 2,809,956 | 10/1967 | Mack | 260/45.75 |
| 2,832,752 | 4/1958 | Weinberg | 260/45.75 |
| 2,914,506 | 11/1959 | Mack | 260/45.75 |
| 3,063,963 | 11/1962 | Wooten | 260/45.75 |
| 3,067,166 | 12/1962 | Zaremsky | 260/45.75 |
| 3,435,098 | 3/1969 | Watanabe | 260/45.75 |

*Primary Examiner*—Donald E. Czaja
*Assistant Examiner*—V. P. Hoke
*Attorney*—Janes & Chipman ABSTRACT: This invention provides a polyvinyl chloride resin stabilizer combination which decreases discoloration of the resin when heated to 350° F. comprising a tetravalent di(alkyl and/or cycloalkyl)-tin alpha- or beta-mercapto carboxylic acid ester composition and a synergizing amount of bivalent stannous tin salt. This invention further provides polyvinyl chloride resin compositions containing the above stabilizer composition and having as a result increased resistance to discoloration when heated.

POLYVINYL CHLORIDE RESIN STABILIZER COMBINATION COMPRISING A TETRAVALENT ORGANOTIN MERCAPTOCARBOXYLIC ACID COMPOUND AND A DIVALENT STANNOUS TIN SALT

This invention relates to polyvinyl chloride resin stabilizer compositions comprising, in combination, a tetravalent organotin compound and a divalent tin, a stannous tin salt, and more particularly a combination of an organotin mercaptocarboxylic acid ester and stannous tin salt; to polyvinyl chloride resin compositions containing these compounds and having as a result an improved resistance to the development of discoloration during heating; and to a process using such compounds for improving the resistance of the polyvinyl chloride resins to discoloration, particularly early discoloration, when heated.

Organotin mercapto acid esters in which tin is in the tetravalent state are now recognized as being among the most effective stabilizers for inhibiting the degradation and resulting discoloration of polyvinyl chloride resins at the high temperatures, e.g. 350° or 375° F., to which they are subjected during working. Although these compounds have been successful in providing good stability for one hour or more at 350° to 375° F., many of these compounds impart or do not entirely prevent an early yellow discoloration to the resin, which is manifested before severe heat deterioration really sets in. This early discoloration has not been considered disadvantageous for many uses, and the efforts of most workers in this field have been directed towards minimizing the onset of the more serious heat deterioration which sets in during long heating, as in milling. However, because of this discoloration and the accompanying haziness or cloudiness that may also appear, it has not been possible in all cases to obtain a substantially clear and colorless polyvinyl chloride resin composition.

Although early discoloration and any accompanying cloudiness are not nearly so intense as later discoloration and embrittlement arising from heat deterioration of the resin, it has been recognized that the early discoloration arising during the first fifteen to thirty minutes of heating affects a relatively greater proportion of the resin. This is because the average period of time during which a given amount of resin product remains in the processing equipment, even in a continuous process which includes recycling of portions of the worked product, is less than thirty minutes. Only a minor portion of the resin will be subjected to working temperatures for periods of up to one hour or longer. Hence, the preservation of a good color and clarity during the first thirty minutes of heating can be more difficult than the protection of the relatively small proportion of the resin by long term heat stabilizers, such as the organotin mercapto acid esters.

The stabilizing effectiveness of organotin compounds is attributed to the presence of tin-to-carbon linkages combined with tin-to-sulfur and/or tin-to-oxygen linkages. Tin compounds containing only tin-to-oxygen or tin-to-sulfur linkages and no tin-to-carbon linkages lack the remarkable stabilizing activity of the organotin compounds.

Both the stannic and the stannous tin salts have been proposed as stabilizers. These stannic and stannous salts are not the same highly effective stabilizers as are the organotin compounds, and are not used as substitutes for the organotin compounds. The stannous soaps have been disclosed by Caldwell et al. in U.S. Pat. No. 2,629,700 to be superior to stannic soaps and cadmium or lead stearate. However, their method of preparation of the stannous soaps gives material of unusual purity and optimum physical form, while their comparisons seem to have been made with commercial grades of other soaps. It is possible, had the other soaps been prepared with the same care, that different conclusions might have been reached. This patent asserts that the stannous salts are superior to the stannic salts, and the Examples in columns 4 and 5 show that the stannous stearate is better than stannic stearate, but there is no showing vis-a-vis the organotin stearates and in fact neither stannous nor stannic stearate is superior to the organotin stearates.

U.S. Pat. No. 3,067,166 discloses the use of zinc and tin salts free of carbon to metal bonds in combination with esters of mercapto acids for stabilization of halogen-containing vinyl resins. Stannic and stannous chloride are exemplified and claimed.

British patent specification No. 1,008,589 discloses a stabilizing composition comprising (1) carboxylates and/or mercaptides formed from at least two different metal cations, one being an organotin compound and (2) a phenol. The second metal cation is selected from the group consisting of cadmium, zinc, lead, barium, strontium, and calcium. The preferred metal is zinc. Tin salts are not disclosed.

It has now been found, surprisingly, that stannous salts are unique in their ability to synergize dihydrocarbontin mercapto-carboxylic acid esters in which tin is in the tetravalent state in improving the resistance of polyvinyl chloride resins to the development of discoloration when heated at elevated temperatures, e.g. of the order of 350° to 375° F.

In accordance with this invention, there are provided stabilizer compositions for polyvinyl chloride resins comprising a. at least one tetravalent organotin mercapto carboxylic acid ester composition which has an organotin group having two hydrocarbon groups linked to tin through carbon, and one or two α- or β-mercapto carboxylic acid ester groups linked to tin through sulfur, any remaining groups being linked to tin through oxygen or sulfur and being the residue of nonnitrogenous organic compounds having an active hydrogen attached to oxygen or sulfur which is replaceable by a metal, specifically tin, such as phenols, alcohols, carboxylic acids and mercaptans.

b. a synergizing amount of a bivalent stannous tin salt containing two groups selected from the group consisting of bromide and chloride and nonnitrogenous organic groups which are the residue of nonnitrogenous organic compounds having an active hydrogen attached to oxygen which is replaceable by a metal, specifically tin.

It will be evident that this stabilizer composition contains tin in different valence states, and in different forms of valence. In the organotin group, tin is present in the tetravalent state, with two bonds linked to carbon and two bonds not linked to carbon at least one of which is linked to sulfur and optionally, at most one linkage to a carboxylate group, or to oxygen in an alcoholate or a phenolate group. In the stannous salts the tin is in the bivalent state, and not linked to carbon. It appears that the combination of different valence states of tin, and of different forms of valence, is especially favorable for stabilizing activity.

Organotin compounds have previously been used in the tetravalent state, as in dibutyl tin dilaurate. However, this organotin compound is in no way as effective as the combinations of this invention, on an equivalent tin basis. It is evident that the blend of tin compounds of different valence states is more important than a blend of covalent and ionic linkages.

It is also important that the tetravalent tin be linked to carbon in two groups and that mercapto sulfur be present in at least one group, for synergizing effectiveness by the stannous salt. The stannous salt does not synergize organotin carboxylates, such as dibutyl tin diacetate, for example, but it does synergize diorganotin acetate containing one mercapto carboxylic acid ester group. The synergism thus appears to require tetravalent tin linked to two carbon atoms and sulfur.

The stannous salts are unique in that they synergize such organotin compounds, whereas stannic salts and barium, cadmium, and zinc salts do not.

Consequently, the synergism is quite unexpected, and remarkable. In the stabilizer combinations of the invention, the organotin compound imparts long term resistance to heat deterioration; while the stannous salt further enhances resistance to discoloration, particularly early discoloration. The stannous salt in large amounts may interfere with the effectiveness of the organotin compound.

The diorganotin mercaptoacid esters (component A) of the invention can be monomeric or polymeric. The organotin compounds containing the organotin group and the mercapto carboxylic acid ester group can be defined as diorganotin compounds having organic radicals linked to tin only through carbon, sulfur and optionally oxygen having the general formula

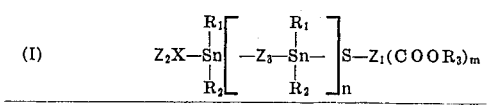

$n$ is within the range from 0 to about 5 and is a number defining the number of $n$ units in the polymer, which can be a mixture of polymers (including dimer) of different values.

The $S-Z_1-(COOR_3)_m$ group is derived from an $\alpha$- or $\beta$-mercapto carboxylic acid ester.

$m$ is the number of $COOR_3$ groups and is an integer from one to four.

$R_3$ is an organic group derived from a monohydric or polyhydric alcohol having from one to about four hydroxyl groups and from about one to about 30 carbon atoms. If there is more than one $COOR_3$ group, the $R_3$ radicals can be the same or different.

$R_1$ and $R_2$ are alkyl or cycloalkyl radicals having from about one to about thirty carbon atoms, preferably four to eight. $R_1$ and $R_2$ can, for example, be methyl, ethyl, propyl, isopropyl, n-butyl, isobutyl, tert-butyl, amyl, hexyl, octyl, isononyl, nonyl, decyl, undecyl, 2-ethylhexyl, iso-octyl, lauryl, palmityl, stearyl, myristyl, behenyl, cyclobutyl, cyclohexyl, methyl cyclohexyl and cyclopentyl, preferably n-butyl and n-octyl.

$Z_1$ is a bivalent organic radical carrying the S and $COOR_3$ groups, in $\alpha$ or $\beta$ relationship, and in addition can contain halogen, free carboxylic acid groups, keto groups, mercapto groups, carboxylic acid salt groups, ether groups and hydroxyl groups. The $Z_1$ radical has from one to about thirty carbon atoms, such as an alkylene, arylene or cycloalkylene radical.

The $-X-Z_2$ group is $-S-Z_1(COOR_3)_m$ or an organic group linked to tin through oxygen or sulfur and is the residue of an organic carboxylic acid, mercaptan, alcohol or phenol; X is $-OOC-$, $-O-$, or $-S-$, and $Z_2$ is a hydrocarbon group or a hydrocarbon group substituted with noninterfering groups such as mercaptide, hydroxyl, carboxyl, ester, carbonyl, halogen, ether or mercapto acid ester groups. The $Z_2$ radical has from about one to about 30 carbon atoms and can include saturated and unsaturated aliphatic, cycloaliphatic and heterocyclic groups and aromatic groups.

Such groups include carboxylates where X is OOC—, such as acetates, propionates, laurates, hexoates, stearates, maleates, fumarates, and lactates; mercapto alkyl where X is sulfur, such as thio-lauryl, thiooctyl, thiodecyl and mercapto aryl such as thiophenyl; and alcoholates or phenolates, where X is oxygen, such as methyloxy, propyloxy, octyloxy, phenoxy, benzyloxy and 4-t-butyl phenoxy.

The $-S-Z_1-(COOR_3)_m$ groups include the esters of aliphatic, aromatic, cycloaliphatic and heterocyclic acids which contain inert substituents such as halogen, hydroxyl, keto and alkoxy groups, such as, for example, esters of 3-mercapto -2,3-dimethyl butyric acid, 2-mercaptopropionic acid, 3-mercaptopropionic acid, 2-mercaptobutyric acid, 3-mercaptobutyric acid. 3-mercapto-4-hydroxy butyric acid, 2-mercapto-3-methylbutyric acid, 3-mercapto-4,5-dimethyl hexanoic acid, 2-mercaptostearic acid, 3-mercapto-oleic acid, 2-mercapto-valeric acid, 3-mercapto-hexanoic acid, 3-mercapto-4-ethylhexanoic acid, thiomalic acid, thiocitric acid, dithiolactic acid, 3-mercaptoglutaric acid, 2-mercaptopimelic acid, 2-mercaptosuberic acid, thiosalicylic acid, 2-mercaptocyclohexane carboxylic acid, 3-mercapto-2-naphthoic acid, 3-mercaptofuroic acid, and 2-mercaptolauric acid, and mixtures of these. Preferred are the esters of thioglycolic, alpha and beta mercapto propionic and thiomalic.

$R_3$ is an organic group derived from a monohydric or polyhydric alcohol of the formula $R_4-(OH)_{n_4}$ where $n_4$ is an integer from one to about four, but is preferably one or two.

Thus, $R_4$ can be alkyl, alkylene, alkenyl, aryl, arylene, mixed alkyl-aryl, mixed aryl-alkyl, cycloaliphatic and heterocyclic, and can contain from about one to about thirty carbon atoms, and can also contain ester groups, alkoxy groups hydroxyl groups, halogen atoms and other inert substituents. Preferably, $R_4$ is derived from a monohydric alcohol containing from one to about 30 carbon atoms, such as methyl, ethyl, propyl, n-butyl, t-butyl, isobutyl, octyl, isooctyl, 2-ethylhexyl, decyl, lauryl, octadecyl, myristyl, palmityl, oleyl, dodecyl, isotridecyl and ricinoleyl alcohols, cyclic monohydric alcohols, such as cyclopropanol, 2,2-dimethyl-1-cyclopropanol, cyclobutanol, 2-phenyl-1-cyclobutanol, 2-phenyl-1-cyclobutanol, cyclopentanol, cyclopentenol, cyclohexanol, cyclohexenol, 2-methyl-, 3-methyl-, and 4-methyl-cyclohexanol, 2-phenyl-cyclohexanol, 3,3,5-trimethyl cyclohexanol, 1,4-cyclohexadiene-3-ol, cycloheptanol, cycloheptene-3-ol, 1,5-cycloheptadiene-3-ol, 2-methyl-, 3-methyl- and 4-methyl cycloheptanol, cyclooctanol, cyclooctenol, cyclononanol, cyclodecanol, cyclodecene-3-ol, cyclododecanol, the para-menthanols, such as 3-hydroxy-p-menthane, 2-hydroxy-p-menthane, the para-menthenols such as αterpineol, borneol, pine oil, fenchol, 2,2-di-methyl-3-6-endo-methylene cyclohexanol, methyl borneol, 2,2,10-trimethyl 3,6-endo-methylene cyclohexanol, the cyclic sesquiterphenols such as farnesol and nerolidol, the sterols such as cholesterol, dihydrocholesterol, ergosterol, 24-ethyl cholesterol, the condensed alicyclic alcohols such as 1-, and 2-hydroxy-1,2-3,4-tetrahydronaphthalene and 1-, and 2-hydroxydecahydronaphthalene, or from a dihydric alcohol such as glycols containing from two to about thirty carbon atoms, including ethylene glycol, propylene glycol, diethylene glycol, dipropylene glycol, tetramethylene glycol, neopentyl glycol and decamethylene glycol, 2', 2'-4-trimethyl pentane-diol, 2,2',4,4'-tetramethyl cyclobutane-diol, cyclohexane-1,4-dimethanol, 4,4'-isopropylidenedicylohexanol, and polyols such as glycerine, triethylol propane, mannitol, sorbitol, erythritol, dipentaerythritol, pentaerythritol, and trimethylol propane.

$Z_3$ is a bivalent oxygen group or a bivalent group which is the bivalent residue of a dicarboxylic acid, a mercapto acid or a mercapto alcohol.

Preferred monohydric alcohols are $C_6-C_{18}$ aliphatic alcohols and cyclohexanol. Preferred polyhydric alcohols are neopentyl glycol, pentaerythritol and trimethylol propane.

Where $n$ equals O, the organotin compound has the formula:

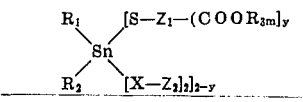

where $y$ is the number of $S - Z_1(COOR_3)_m$ groups and can be one or two. In preferred monomeric compounds, $R_1$, $R_2$ and $R_3$ are alkyl and $y = 2$, i.e. dialkyltin bis(alkyl mercapto carboxylate).

The $X-Z_2$ group can be joined with the $S-Z_1-(COOR_3)_m$ group to form a divalent group linked to tin to form a heterocyclic ring including the tin atom; e.g.,

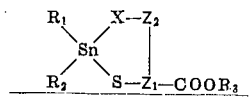

These diorganotin mercapto acid esters, where not known, can be readily prepared by reaction of the mercaptocarboxylic acid esters with the corresponding organotin oxide or chloride. For a more complete explanation of the process for making, and for additional examples of these diorganotin mercapto ester compounds, see U.S. Pat. Nos. 2,648,650 to Weinberg et al., 2,641,596 and 2,752,325 to Leistner, and 2,914,506 to Mack, and Canadian Pat. No. 649,989 to Mack.

The organotin mercapto acid esters containing two different mercapto acid ester groups or one mercapto acid ester group and an —X$Z_2$ group can be prepared by reacting the desired organotin oxide or chloride with a mixture of the mercapto acid esters, or other compound, e.g. mercapto, carboxylic acid or alcohol, or by heating two different organotin mercaptoacid esters or one organotin mercaptoacid ester and, e.g., an organotin carboxylic acid salt, together.

Polymeric organotin mercapto acid esters falling within the present invention according to formula I when $n$ is greater than 0 are formed of a chain of organotin groups wherein each tin atom is linked to two alkyl and/or cycloalkyl groups. There is at least one α- or β-mercapto carboxylic acid ester group attached through a sulfur atom to one terminal tin atom of the chain. The linking group between tin atoms of the chain can be any bivalent group linked to tin through oxygen or sulfur. Such polymers can be prepared according to U.S. Pat. No. 2,809,956 or by reacting excess diorganotin oxide with mercaptoacid esters or mixtures of mercaptoacid esters and carboxylic acids, alcohols or mercaptides. Alternatively, a stoichiometric excess of diorganotin halide can be reacted with mercapto acid esters or mixtures of mercaptoacid esters and carboxylic acids, alcohols or mercaptides in the presence of a base such as NaOH.

The preferred polymeric organotin mercaptoacid esters according to the present invention are those where $Z_3$ is oxygen, $n$ is not greater than 1 and X $Z_2$ is a mercaptoacid ester residue.

The following organotin mercapto carboxylic acid esters are typical of those coming within the invention:

(1) 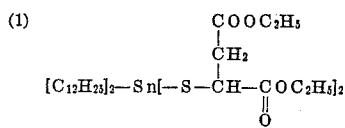

(2) 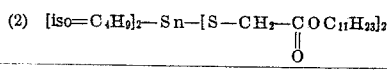

(3) 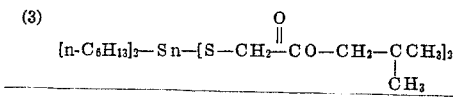

(4) 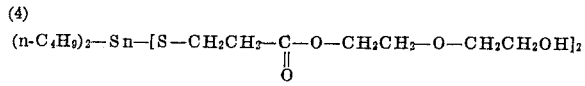

(5) 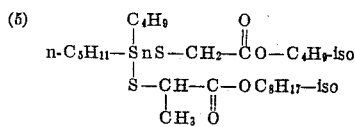

(6) 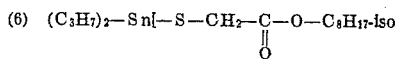

(7) 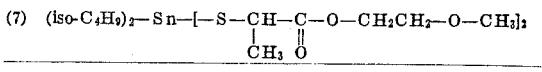

(8) 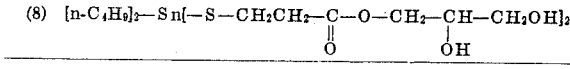

(9) 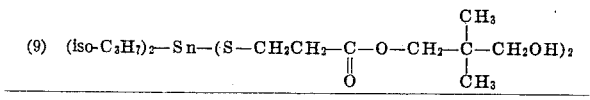

(10) 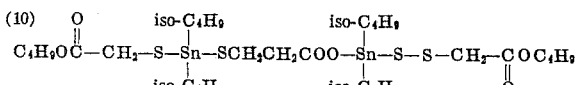

(11) 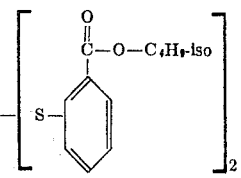

(12) 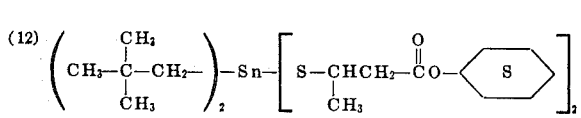

(13) 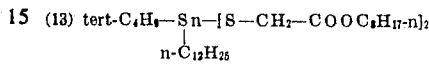

(14) 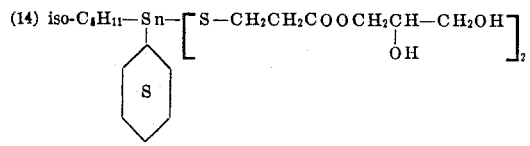

(15) 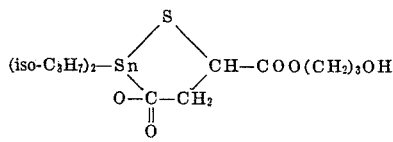

(16) 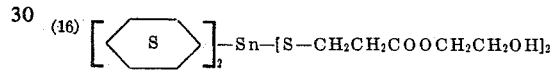

(17) 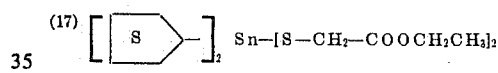

(18) 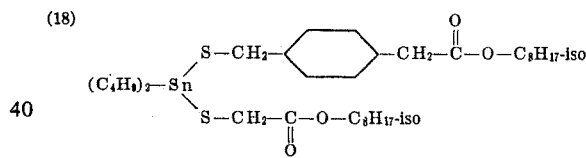

(19) 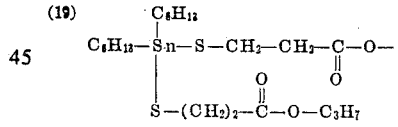

(20) 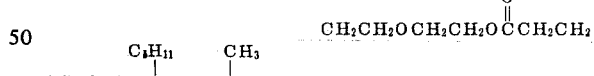

(21) 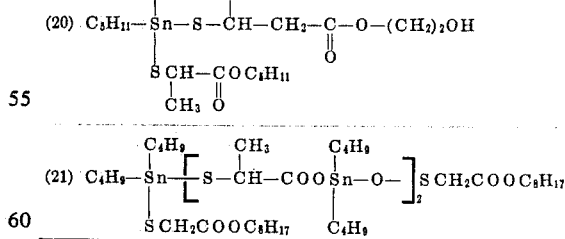

(22) 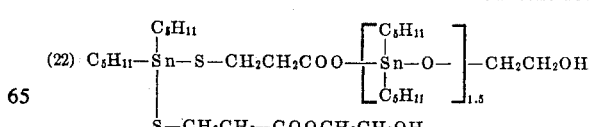

(23) 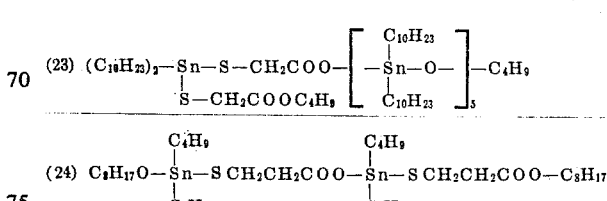

(24) 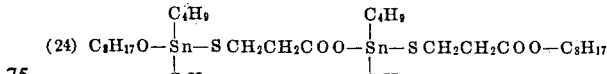

(25) $\text{C}_8\text{H}_{17}\text{OOC}-\text{CH}_2\text{CH}_2\text{S}-\overset{\overset{\text{n-C}_4\text{H}_9}{|}}{\underset{\underset{\text{n-C}_4\text{H}_9}{|}}{\text{Sn}}}-\text{O}-\overset{\overset{\text{n-C}_4\text{H}_9}{|}}{\underset{\underset{\text{n-C}_4\text{H}_9}{|}}{\text{Sn}}}-\text{SCH}_2\text{CH}_2-\text{COO}-\text{C}_8\text{H}_{17}$ It has been found that the diorganotin mercaptocarboxylic acid ester composition can also be prepared by mixing into the resin a mixture of an alpha- or beta-mercapto carboxylic acid ester and a diorganotin compound. It is not known why such a combination gives the synergistic effect when mixed with a stannous salt, but it is postulated that the diorganotin mercapto carboxylic acid ester is formed in situ during mixing with the resin at elevated temperatures.

Where the formulation comprises a combination of the α- or β-mercapto carboxylic acid ester and a separate diorganotin compound, the diorganotin compound can be selected from diorganotin oxides, and diorganotin compounds having attached groups falling within the —X— groups defined above, including carboxylic acid salts, such as acetates, laurates, stearates, maleates, fumarates and lactates, or alcoholates, such as propyloxy, octyloxy or methoxy compounds.

The second component (b) is a divalent stannous tin compound wherein the tin is linked to nonnitrogenous acidic organic groups or to bromide or chloride.

The organic stannous salts according to the present invention preferably include stannous salts of carboxylic acids, alcohols and phenols. The stannous salts can also comprise mixtures of anions, e.g., carboxylate and phenolate.

The stannous salts according to this invention have the formula

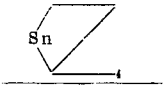

wherein $Z_4$ comprises any of bromide or chloride anions or monovalent or divalent nonnitrogenous organic groups in sufficient number to satisfy the two valences of the tin. The organic groups include monovalent and divalent residues of carboxylic acids, hydroxy carboxylic acids, phenols, and alcohols.

The organic acid group of the stannous carboxylates ordinarily has from about one to about twenty carbon atoms. Aliphatic, aromatic, cycloaliphatic and oxygen-containing heterocyclic mono- and poly-carboxylic acid groups are exemplary.

The acid groups can also be substituted, if desired, with inert groups such as halogen, ether, and hydroxyl. The oxygen-containing heterocyclic acid groups include oxygen and carbon in the ring structure, of which alkyl-substituted furoic acid groups are exemplary. As exemplary of the organic acid groups there can be mentioned the following: acetic caproic, capric, 2-ethyl hexoic, caprylic, pelargonic, hendecanoic, lauric, tridecanoic, pentadecanoic, margaric, arachidic, suberic, azelaic, sebacic, brassylic, thapsic, 2-propyl-1,2,4-pentanetricarboxylic, chlorocaproic, hydroxy-capric, stearic, hydroxy stearic, palmitic, oleic, linoleic, myristic, dodecyl thioether propionic acid $C_{12}H_{25}-S-(CH_2)_2-COOH$, oxalic, adipic, succinic, tartaric, α-naphthoic, hexahydrobenzoic, benzoic, phthalic, phenyl-acetic, terephthalic, glutaric, monomethyl succinate, isobutyl benzoic, phthalic monoethyl ester, ethylbenzoid, isopropylbenzoic, ricinoleic, maleic, fumaric, monoethyl maleate, p-t-butylbenzoic, n-hexyl benzoic, salicyclic, β-naphthoic, β-naphthalene acetic, orthobenzoyl benzoic, naphthenic acids derived from petroleum, abietic, dehydroabietic, methyl furoic and thienoic.

The alcohol group of the stannous alcoholates can be derived from any aliphatic, aromatic, cycloaliphatic, or heterocyclic monohydric or polyhydric alcohol containing from one to about ten hydroxyl groups, and from about one to about twenty carbon atoms.

Typical monohydric alcohol groups include butyl, ethyl, propyl, nonyl, hexyl, 2-ethylhexyl, lauryl, isooctyl, decyl, palmityl, stearyl, oleyl, benzyl, α- and β-phenethyl, 1,2,3,4-tetrahydro-2-naphthyl, 1-naphthalene methyl, cyclohexyl, cyclopentyl, cyclododecyl, methyl, tetrahydrofurfuryl, butoxyethyl, methoxyethyl, ethoxyethyl and phenoxyethyl.

Typical polyhydric alcohols from which the stannous alcoholates can be derived include pentaerythritol, dipentaerythritol, glycerol, ethylene glycol, 1,2-propylene glycol, 1,3-propylene glycol, 1,2-butylene glycol, 1,3-butylene glycol, 1,4-butylene glycol, diethylene glycol and butyl glucoside, neopentyl glycol, 9-octadecene-1,12-diol, 1,4-cyclohexane diol, and 1,4-cyclopentane diol, erythritol, mannitol, sorbitol, and tripentaerythritol.

The stannous phenolates of the present invention are preferably salts of hydrocarbon-substituted phenols.

The phenol component of the stannous phenolates can be derived from a monocyclic or polycyclic mono- or polyphenol or hydrocarbon-substituted phenol. The hydrocarbon substituent contains from one to thirty carbon atoms, and there can be up to five substituents per phenolic nucleus. The phenol can contain one or more phenolic nuclei, and one, two or more phenolic groups. In addition, the phenolic nucleus can contain a mercapto group.

Among such phenolate groups there can be mentioned those derived from phenol, o-cresol, p-cresol, m-cresol, 2,6-ditertiary-butyl-p-cresol, Bisphenol A, p-propylphenyl, p-n-butyl phenol, p-isoamyl phenol, o-isooctyl phenol, p-t-nonylphenol, m-n-decyl phenol, o-t-octyl phenol, p-isohexyl phenol, p-octadecyl phenol, 2,6-diisobutyl phenol, 2-methyl-4-propyl phenol, 2,6-diamyl phenol, 2methyl-4-isohexyl phenol, 2-methyl-6-t-octyl phenol, 2,6-di-t-nonyl phenol, 2,4-di-t-dodecyl phenol, p-2-ethylhexyl phenol, and phenyl phenol, phloroglucinol, resorcinol, catechol, eugenol, pyrogallol, α-naphthol, β-naphthol, p-octyl phenol, p-octyl cresol, p-dodecyl phenol, p-isooctyl-m-cresol, p-isohexyl-o-cresol, 2,6-ditertiary-butyl phenol, 2,6-diisopropyl-phenol, 2,4-ditertiary-butyl-m-cresol, methylenebis(2,6-ditertiary-butyl-phenol), 2,2-bis(4-hydroxy phenyl) propane, methylene-bis(p-cresol), 2,4'-thiobisphenol, 4,4'-thiobis(3-methyl-6-tertiary-butyl-phenol), 2,2-thiobis(4-methyl-6-tertiary butyl-phenol), 2,6-diisooctyl resorcinol, 4-octyl pyrogallol, and 3,5-ditertiary-butyl catechol.

The stannous salts are known compounds. For example the preparation of stannous alkylcatecholates is set forth in U.S. Pat. No. 2,581,940. Methods for preparing a complex with a phenol, which is believed to be the phenolate salt or at least the equivalent of the phenolate is set forth in U.S. Pat. No. 2,626,954.

Specific examples of stannous salts suitable for use herein include, but are not limited to stannous bromide, stannous chloride, stannous stearate, stannous-2-ethylhexoate, stannous benzoate, stannous laurate, stannous oleate, stannous naphthenate, stannous hexahydrobenzoate, stannous succinate, stannous maleate, stannous tartrate, stannous phenolate, stannous octyl phenolate, stannous lactate, stannous β-naphtholate, stannous t-butyl catecholate, stannous salt of Bisphenol A, stannous cyclohexylidene bis-phenolate, stannous furoate, stannous ethoxide, stannous hexoxide, stannous phthalate, stannous octoxide, stannous decoxide, stannous 2-ethyl hexoxide, stannous glycerolate, and 2,4,8,10-tetraoxa-3,9-distanna-6,6-bi-spiro-undecane.

Examples of useful combinations of organotin alpha- or beta-mercapto carboxylic acid ester compositions and stannous salts include:
di-n-butyltin bis(isoctyl thioglycolate) and stannous octoate,
di-n-butyltin bis(di-n-butyl thiomalate) and stannous toluate,
di-n-octyltin bis(isooctyl thioglycolate) and stannous octoate-stearate,
di-n-propyltin bis(2-ethyl hexyl beta-mercapto propionate) and stannous octyl phenolate,
di-n-cyclohexyltin bis(cyclohexyl alpha-mercapto propionate) and stannous monomethyl maleate,
di-methyltin bis(2-ethyl butyl alpha-mercapto butyrate) and stannous 3,5-di-tert-butyl-4-hydroxyphenyl propionate, di-2-ethylhexyltin bis(tetrahydrofurfuryl alpha-mercapto laurate) and stannous methoxyl benzoate, di-n-lauryltin bis(butoxyethyl alpha-mercapto caproate) and stannous oleate, di-n-propyltin bis(2,2-dimethyl pentyl thioglycolate) and stannous cinnamate, di-n-butyltin 4,4'-isopropylidene bis(cyclohexyl thioglycolate) and stannous chloride, di-n-butyltin monolauryl thioglycolate monomethoxide and stannous octoate chloride, di-n-butyltin mono-isooctyl mercapto propionate mono-2-ethylhexoate and stannous methylate di-n-octyltin mono-isooctyl thioglycolate monomethyl maleate and stannous dimethyl mellitate, di-n-butyltin mono-methyl alpha-mercapto laurate mono-isooctyl thioglycolate and stannous ricinoleate, di-n-butyltin trimethylol propane dimercapto propionate and stannous chlorobenzylate, di-n-propyltin monoethylene glycol monomercaptoacetate mono-2-ethylhexoxide and stannous neodecanoate, di-n-pentyltin mono-butyl mercapto propionate monolauryl mercaptide and stannous salicylate.

The invention is applicable to any polyvinyl chloride resin. The term "polyvinyl chloride" as used herein is inclusive of any polymer formed at least in part of the recurring group

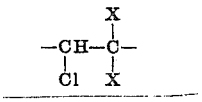

and having a chlorine content in excess of 40 percent. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides such as those disclosed in British Pat. No. 893,288 and also copolymers of vinyl chloride in a major portion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially stretch oriented polyvinyl chlorides described in U.S. Pat. No. 2,984,593 to Isaksem et al., that is, syndiotactic polyvinyl chloride, as well as atactic and isotactic polyvinyl chlorides.

The stabilizing combinations of this invention, both with and without supplementary stabilizers, are excellent stabilizers for both plasticized and unplasticized polyvinyl chloride resins. When plasticizers are to be employed, they may be incorporated into the polyvinyl chloride resins in accordance with convention means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5 percent, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact resistance of unplasticized resins, can also be added to the resin compositions stabilized by the present invention in minor amounts of usually not more than 10 percent. Examples of such impact modifiers include chlorinated polyethylene, ABS polymers, and polyacrylate-butadiene graft copolymers.

The stabilizer combination of this invention can also be used in combination with supplementary stabilizers. Highly effective supplemental stabilizers are the phenolic antioxidants. These are generally hydrocarbon substituted, monocyclic or polycyclic phenols having from one to five hydroxyl groups and from one to five hydrocarbon substituents per aromatic carbocyclic ring. Other supplementary stabilizers useful with the present invention include the organic phosphite esters as well as other organotin compounds.

The stabilizer components of the invention including the organotin mercaptoacid ester composition and the stannous salt are employed in an amount sufficient to impart the desired heat resistance to heat deterioration at working temperatures of 350° or 375° F. and above. The more rigorous the conditions to which the resin is subjected during working and mixing and the longer the term required for resistance to degradation the larger the amount of stabilizer required.

Generally as little as 0.25 percent total of the organotin mercapto ester composition by weight of the resin imparts some resistance to heat deterioration, and this may be adequate in many cases. There is no critical upper limit on the amount of the organotin composition, but amounts above about 10 percent by weight of the resin do not give an increase in stabilizing effectiveness commensurate with the additional stabilizer employed. Preferably, the amount is from about 0.5 to about 5 percent by weight of the resin.

The proportion of the stannous salt to the organotin mercaptoacid ester is sufficient to enhance the effectiveness of the organotin compound in imparting resistance to discoloration, particularly early discoloration. In fact, too high a proportion of stannous salt can decrease stability, rather than increase it. Generally, as little as 0.5 percent of stannous tin by weight of the tin in the organotin alpha- or beta-mercapto-acid ester markedly improves resistance to discoloration. For optimum results, the preferred amount of the stannous tin is from about 1 to about 8 percent by weight of the tin in the organotin alpha- or beta-mercaptoacid ester based on weight of the metal; at higher amounts there can be some decrease in the long term stability of the resin although some early color improvement is obtained. When the amount of tin present in the stannous salt is greater than 15 percent of the tin present in the organotin mercaptoacid ester composition, the overall effect may be one of decreasing stability.

The organotin mercaptoacid ester according to this invention can be formulated as the compound or as a mixture of a precursor organotin compound plus an alpha- or beta-mercapto carboxylic acid ester. Examples of the organotin compounds which can be mixed with the alpha- or beta-mercapto carboxylic acid esters to form the desired combination of this invention include dialkyl- or dicyclo-alkyltin oxides, such as dibutyltin oxide and dioctyltin oxide, carboxylates, such as dibutyltin diacetate, dioctyltin dilaurate and dibutyltin dioctoate, and alcoholates such as dibutyltin dimethoxide.

When the diorganotin compound is mixed with the free mercapto acid ester in the resin, the resulting mixture behaves in the same manner as the diorganotin alpha- or beta-mercapto carboxylic acid ester. Perhaps this compound is formed in situ from the mixture. It is also possible that neither the compound nor the mixture acts as the stabilizer, but some complex that is formed by either in the presence of the resin. Whatever the reason, the two routes are equivalent for the purpose of the invention. The amounts of each of the diorganotin compound and alpha- or beta-mercapto carboxylic acid ester added should be sufficient to form the desired amount of the diorganotin mercapto carboxylic acid ester assuming the compound would be formed in situ. The hypothetical compound formed by the mixture can include one $-X Z_2$ group, as explained above.

It is also known to improve the clarity and to decrease early discoloration of a resin stabilized with an organotin α- or β-mercaptoacid ester by the addition of free alpha- or beta-mercapto alcohol and/or acid. Such a combination was the earliest of the materials known to improve the ability of the organotin mercapto acid ester to prevent early discoloration. The present invention can be used to further upgrade this earlier combination by further decreasing early discoloration. Generally, the alpha- and beta-mercapto alcohol and/or acid will be present in an amount of from about 0.1 up to about 15 percent by weight of the organotin mercaptoacid ester and preferably from about 0.25 to about 4 percent by weight of the organotin mercaptoacid ester.

The following examples in the opinion of the inventor represent preferred embodiments of this invention.

EXAMPLES 1 to 3

Rigid or nonplasticized polyvinyl chloride resin formulations were prepared having the following composition:

| | Parts by Weight |
|---|---|
| Polyvinyl chloride homopolymer (Diamond 40) | 100 |
| Acrylonitrile-butadiene-styrene copolymer, impact modifier (Blendex 401) | 10 |
| Lubricant (Wax E) | 0.25 |
| Stabilizers | Noted in table I, below |

The ingredients were blended and compounded on a two-roll mill at 350° F., for 5 minutes, sheeted off, and cut into strips. The strips were placed in an air oven heated to 375° F. and samples removed at 15-minute intervals and attached to cards. The appearance of the samples on the cards is noted in table I, below.

TABLE I

| | Control A | Amount | Control B | Amount | Example 1 | Amount |
|---|---|---|---|---|---|---|
| Stabilizer composition | Dibutyltin bis(isooctyl mercapto propionate). | 2.0 | Stannous octoate. | 2.0 | Dibutyltin bis(isooctyl mercapto propionate). | 1.97 |
| | | | | | Stannous octoate. | 0.03 |
| Time (minutes): | Color: | | Color: | | Color: | |
| Initial | Clear, colorless | | Clear, colorless | | Clear, colorless. | |
| 15 | Light yellow | | Black | | Very light yellow. | |
| 30 | Yellow | | | | Do. | |
| 45 | ...do | | | | Do. | |
| 60 | Dark yellow | | | | Light yellow. | |
| 75 | Very dark yellow, charred edges | | | | Do. | |
| 90 | Brown, charred edges | | | | Dark yellow. | |
| 105 | Almost black | | | | Almost black. | |
| 120 | ...do | | | | Do. | |

| | Control C | Amount | Example 2 | Amount | Control D | Amount | Example 3 | Amount |
|---|---|---|---|---|---|---|---|---|
| Stabilizer composition | Stannous oleate. | 2.0 | Dibutyltin bis(isooctyl mercapto propionate). | 1.95 | Stannous benzoate-octoate. | 2.0 | Dibutyltin bis(isooctyl mercapto propionate). | 1.97 |
| | | | Stannous oleate. | 0.05 | | | Stannous benzoate-octoate. | 0.03 |
| Time (minutes): | Color: | | Color: | | Color: | | Color: | |
| Initial | Clear, colorless | | Clear, colorless | | Clear, colorless | | Clear, colorless. | |
| 15 | Black | | Very light yellow | | Black | | Very light yellow. | |
| 30 | | | ...do | | | | Do. | |
| 45 | | | ...do | | | | Do. | |
| 60 | | | Light yellow | | | | Light yellow. | |
| 75 | | | ...do | | | | Do. | |
| 90 | | | Dark yellow | | | | Dark yellow. | |
| 105 | | | Almost black | | | | Almost black. | |
| 120 | | | ...do | | | | Do. | |

Control A shows that the dibutyltin bis(isooctyl mercapto propionate) is an effective heat stabilizer.

Control B shows that stannous octoate alone is not an effective stabilizer, inasmuch as the resin turns black after 15 minutes. However, Example 1 clearly indicates that even small amounts of stannous octoate in combination with dibutyltin bis(isooctyl mercapto propionate), greatly improve the resistance to discoloration at 375° F. of this polyvinyl chloride resin formulation. After fifteen minutes of heating, examples 1, 2 and 3 retain a significantly better color, being substantially less discolored than A. After 45 minutes of heating, example 1 is less discolored than control A after 15 minutes. Moreover, example 1 was no more discolored even after 60 minutes of heating than control A after the first 15 minutes of heating. After 90 minutes of heating example 1 is still only dark yellow which control A becomes after only 60 minutes of heating.

The improvement in resistance to discoloration is quite apparent. The improvement in early discoloration is especially significant. The same improvement is obtained using the stannous oleate and mixed stannous benzoate-octoate salts in examples 2 and 3, respectively. Each of the stannous salts provides substantially the same improvement in reducing discoloration during heating of the resin composition of control A containing the dibutyltin bis(iso-octyl mercapto propionate). As can be seen from controls C and D, none of the stannous salts alone are effective stabilizers under the conditions of this test.

EXAMPLE 4

A resin composition was prepared as in examples 1 to 3.

One sample of the resin was mixed with 3 parts of a stannous complex of tert-octylphenolate prepared according to U.S. Pat. No. 2,626,954 and a second sample was mixed with a mixture of 0.05 parts of the stannous complex of tert-octylphenol and 1.95 parts dibutyltin bis(iso-octyl mercapto propionate). The stannous complex of tert-octyl-phenol alone is an ineffective stabilizer as was the stannous octoate, oleate and benzoate-octoates of controls A, B and C. The resin containing the mixtures of the stannous complex of tert-octylphenol showed substantially the same reduction in discoloration compared to control A as was shown by example 1.

EXAMPLES 5 AND 6

Another rigid polyvinyl chloride resin composition having the following formulation was prepared:

| | Parts by Weight |
|---|---|
| Polyvinyl chloride homopolymer (Diamond 450) | 100 |
| Mineral Oil | 0.5 |
| Isooctyl thioglycolate | 2.0 |
| Stannous octoate diorganotin compound | As shown in table II |

The above formulation was mixed and tested as in examples 1 to 3.

The total amounts of organotin compound added to each formulation was computed so that the same amount of organotin moiety, i.e. dibutyltin, is added to all of the samples.

Controls E and F show that the combinations of isooctyl thioglycolate plus dibutyltin oxide or dibutyltin diacetate are effective heat stabilizers. The further combination with stannous octoate, examples 5 and 6 improves further the resistance to early discoloration of this resin when heated to 375° F.

The combinations of examples 5 and 6, according to this invention show less discoloration than controls E and F for up to 75 minutes.

EXAMPLES 7 AND 8

Polyvinyl chloride resin compositions were prepared according to the following formulation:

| | Parts by Weight |
|---|---|
| Polyvinyl chloride homopolymer (Diamond 40) | 100 |
| Butadiene-styrene-acrylonitrile copolymer (impact improver, Blendex 401) | 10 |
| Wax E | 0.25 |
| Thiolactic acid | 0.03 |
| Stabilizer | As noted in table III |

The above formulations were milled and tested for heat stability at 375° F. using the same blending and test procedures as in examples 1 to 3. The results obtained are set forth in table III.

TABLE II

| | Control E | Amount | Example 5 | Amount |
|---|---|---|---|---|
| Stabilizer composition | Dibutyltin oxide | 0.8 | Dibutyltin oxide | 0.8 |
| | | | Stannous octoate | 0.04 |
| Time (minutes): | Color: | | Color: | |
| Initial | Clear, colorless | | Clear colorless | |
| 15 | Yellow | | Very pale yellow | |
| 30 | do | | Pale yellow | |
| 45 | do | | Light yellow | |
| 60 | do | | do | |
| 75 | do | | do | |
| 90 | Dark yellow, orange edges | | Yellow, dark edges | |
| 105 | Orange | | Dark yellow, charred black border | |
| 120 | Charred | | Black | |
| | Almost black | | | |

| | Control F | Amount | Example 6 | Amount |
|---|---|---|---|---|
| Stabilizer composition | Dibutyltin diacetate | 1.1 | Dibutyltin diacetate | 1.1 |
| | | | Stannous octoate | 0.04 |
| Time (minutes): | Color: | | Color: | |
| Initial | Clear, colorless | | Clear, colorless. | |
| 15 | Yellow | | Very pale yellow. | |
| 30 | do | | Pale yellow. | |
| 45 | do | | Very light yellow. | |
| 60 | do | | Light yellow. | |
| 75 | Dark yellow | | Do. | |
| 90 | Very dark yellow | | Yellow, slightly charred edge. | |
| 105 | Charred, very dark red | | Black. | |
| 120 | Almost black | | | |

TABLE III

| | Control G | Amount | Control H | Amount | Example 7 | Amount | Example 8 | Amount |
|---|---|---|---|---|---|---|---|---|
| Stabilizer composition. | Stannous octoate | 2.0 | Dibutyltin bis(iso-octylthioglycolate). | 1.97 | Dibutyltin bis(iso-octylthioglycolate). | 1.94 | Dibutyltin bis(iso-octylthioglycolate). | 1.94 |
| | | | | | Stannous octoate | 0.03 | SnCl$_2$·2H$_2$O | 0.03 |
| Time (minutes): | Color: | | Color: | | Color: | | Color: | |
| Initial | Clear, very slight yellow tint. | | Clear, colorless | | Clear, colorless | | Clear, colorless. | |
| 15 | Black | | Light yellow | | Very pale yellow | | Very pale yellow. | |
| 30 | | | do | | Pale yellow | | Pale yellow. | |
| 45 | | | Yellow | | Light yellow | | Light yellow. | |
| 60 | | | Dark yellow, red edges | | Yellow | | Do. | |
| 75 | | | Dark red | | Dark yellow, red edges | | Do. | |
| 90 | | | Very dark red | | Dark red | | Yellow, dark edges. | |
| 105 | | | do | | Very dark red | | Dark yellow, charred black border. | |
| 120 | | | | | | | Black. | |

Control H shows the stabilizing effectiveness of a mixture of dibutyltin bis(isooctyl thioglycolate) plus thiolactic acid. Control G shows that the stannous octoate salt is not an effective stabilizer for rigid polyvinyl chloride, inasmuch as the resin turns black after 15 minutes. The addition of either stannous octoate or of the stannous chloride in combination with the mixture of Control H as shown in examples 7 and 8, there is a definite improvement in resistance to early discoloration at 375° F. for this polyvinyl chloride resin formulation. Examples 7 and 8 are less discolored than controls G and H, respectively, during the first 60 minutes of heating at 375° F.

EXAMPLE 9

Polyvinyl chloride resin compositions were prepared according to the following formulation:

| | Parts by Weight |
|---|---|
| Polyvinyl chloride homopolymer (Diamond 40) | 100 |
| Butadiene-styrene-acrylonitrile copolymer (impact improver, Blendex 401) | 10 |
| Stearic acid | 0.5 |
| Stabilizer | As noted in table IV |

The above formulations were milled and tested for heat stability at 375° F., using the blending and test procedures of example 1. The results obtained are set forth in table IV.

Control I shows the stabilizing effectiveness of dioctyltin bis(isooctyl thioglycolate). Control J shows that stannous stearate-calcium stearate mixtures are not effective stabilizers for the polyvinyl chloride formulations employed inasmuch as the resin turns black after 15 minutes of heating. Example 9, however, shows that the addition of the stannous stearate in small amounts to the organotin mercaptoacid ester stabilizer improves the resistance to discoloration of the polyvinyl chloride resin formulation at 375° F. Example 9 was less discolored than control I during the first 45 minutes of heating.

COMPARATIVE EXAMPLES I TO V

Contrary to the results obtained using the diorganotin alpha- and beta-mercapto acid esters according to the present invention, diorganotin salts of alpha- and beta-mercapto acids, or mono-organotin mercapto carboxylic acid esters or diorganotin mercaptides other than mercapto acid esters are not synergized with divalent stannous salts. Thus, the diorganotin group, i.e. containing two covalent carbon-tin bonds and the mercapto acid ester groups as well as the stannous tin compound are all critical to the synergistic effectiveness of the claimed combination.

The mixtures shown in table V, below, were blended with the same basic resin formulation as in example 1. The resin mixes were sheeted off and tested as in examples 1 to 3 at 375° F.

TABLE IV

| Control I | Amount | Example 9 | Amount | Control J | Amount |
|---|---|---|---|---|---|
| Dioctyl tin bis (isooctyl thioglycolate). | 1.5 | Dioctyl tin bis (isooctyl thioclycolate). | 1.4 | Calcium stearate | 0.25 |
| | | Calcium stearate | 0.025 | Stannous stearate | 0.75 |
| | | Stannous stearate | 0.075 | | |
| Color | | Color | | Color | |
| Clear, colorless | | Clear, colorless | | Colorless. | |
| Yellow | | Very light yellow | | Black. | |
| Do | | Light yellow | | | |
| Dark yellow | | do | | | |
| Dark red | | Charred yellow | | | |
| Almost black | | Almost black | | | |

TABLE V

| | Example | | | | | |
|---|---|---|---|---|---|---|
| | IA | Amount | IB | Amount | IIA | Amount |
| Stabilizer composition | Dibutyltin bis(dodecyl mercaptide). | 2.0 | Dibutyltin bis(dodecyl- mercaptide). Stannous octoate | 1.97 0.03 | Dibutyltin mercapto propionate. | 2.0 |
| Time (minutes): | Color: | | Color: | | Color: | |
| Initial | Clear, colorless | | Clear, colorless | | Clear, Colorless. | |
| 15 | Yellow | | Yellow | | Very pale yellow. | |
| 30 | do | | do | | Pale yellow. | |
| 45 | do | | do | | Light yellow. | |
| 60 | Dark orange | | Dark yellow | | Do. | |
| 75 | Black | | Charred yellow | | Yellow. | |
| 90 | | | Black | | Dark yellow. | |
| 105 | | | | | Orange. | |
| 120 | | | | | Dark orange. | |

| | Example | | | | | |
|---|---|---|---|---|---|---|
| | IIB | Amount | IIIA | Amount | IIIB | Amount |
| Stabilizer composition | Dibutyltin mercapto propionate. Stannous octoate | 1.97 0.03 | Monobutyltin tris(isooctyl thioglycolate). | 2.0 | Monobutyltin tris (isooctyl thioglycolate). Stannous octoate | 1.97 0.03 |
| Time (minutes): | Color: | | Color: | | Color: | |
| Initial | Clear, colorless | | Clear, colorless | | Clear, colorless. | |
| 15 | Very pale yellow | | Very pale yellow | | Pale yellow. | |
| 30 | Pale yellow | | Very light yellow | | Light yellow. | |
| 45 | Light yellow | | Light yellow | | Dark yellow. | |
| 60 | do | | Yellow | | Almost black. | |
| 75 | Yellow | | Dark yellow | | Black. | |
| 90 | Dark yellow | | Charred yellow | | | |
| 105 | Orange | | Black | | | |
| 120 | Dark orange | | | | | |

| | Example | | | | | |
|---|---|---|---|---|---|---|
| | IVA | Amount | IVB | Amount | VA | Amount |
| Stabilizer composition | Dioctyltin oxide<br>Thiomalic acid<br>2,6-di-t-butyl-p-cresol | 0.93<br>0.37<br>0.7 | Dioctyltin oxide<br>Thiomalic acid<br>2,6-di-t-butyl-p-cresol<br>Calcium stearate<br>Stannous stearate | 0.93<br>0.37<br>0.7<br>0.25<br>0.075 | Dibutyltin sulfide<br>Dibutyltin bis(isooctyl maleate)<br>2,6-di-t-butyl-p-cresol | 0.09<br>0.07<br>0.03 |
| Time (minutes): | Color: | | Color: | | Color: | |
| Initial | Clear, colorless | | Clear, colorless | | Clear, colorless. | |
| 15 | Pale yellow | | Light yellow | | Dark orange. | |
| 30 | Light yellow | | do | | Very dark red. | |
| 45 | Yellow | | Yellow | | Almost black. | |
| 60 | do | | do | | | |
| 75 | Dark yellow | | Dark yellow | | | |
| 90 | Orange | | Dark charred orange | | | |
| 105 | Charred dark orange | | Very dark charred orange | | | |
| 120 | Very dark orange | | Almost black | | | |

| | Example | | | | | |
|---|---|---|---|---|---|---|
| | VB | Amount | | Amount | | Amount |
| Stabilizer composition | Dibutyltin sulfide<br>Dibutyltin bis(isooctyl maleate)<br>2,6-di-t-butyl-p-cresol<br>Stannous octoate | 0.09<br>1.07<br>0.03<br>0.03 | Monobutyltin tris(isooctyl thioglycolate) | 2.0 | Monobutyltin tris(isooctyl thioglycolate)<br>Stannous octoate | 2.0<br>0.03 |
| Time (minutes): | Color: | | 238/30-E, Color: | | 238/30-F, Color: | |
| Initial | Tan | | Clear, colorless | | Clear, colorless. | |
| 15 | Dark orange | | Very pale yellow | | Very pale yellow. | |
| 30 | Almost black | | Pale yellow | | Light yellow. | |
| 45 | | | Light yellow | | Yellow. | |
| 60 | | | Yellow | | Black. | |
| 75 | | | Dark yellow | | | |
| 90 | | | Black | | | |

The above comparative examples I through V do not show the same improvement by the addition of stannous salts to the particular organotin compounds used as was shown by earlier examples 1 through 9 using a diorganotin mercapto carboxylic acid ester according to this invention. In no case was there any decrease in discoloration caused by the addition of the stannous salt. In several cases, the addition of stannous octoate to the organotin compound used actually resulted in an increase in discoloration rather than a decrease; see samples IIIA and B, VA and B.

The above tests show the criticality of the definition of the organotin compound of the present invention. The results of examples IA and B show that the addition of stannous octoate to dibutyltin bis(dodecyl mercaptide) does not decrease early discoloration. Examples IIA and B show that the addition of stannous octoate to dibutyltin mercapto carboxylic acid propionate, a diorganotin beta-mercapto carboxylic acid salt, does not decrease discoloration. The addition of stannous octoate to monobutyltin tris(isooctyl thioglycolate), examples IIIA and B do not decrease discoloration, but in fact cause an increase in early discoloration.

Examples IVA and B show the lack of improvement when adding stannous stearate to a mixture of dioctyltin oxide and thiomalic acid, another alpha-beta mercapto carboxylic acid. Examples VA and B show the *increase* in discoloration caused by the addition of stannous stearate to mixtures of dibutyltin sulfide and dibutyltin bis(isooctyl maleate).

COMPARATIVE EXAMPLE VI

The significance of using a divalent stannous salt in the combination of this invention is shown by the following test using stannic octoate, formed by the oxidation of stannous octoate with hydrogen peroxide. There was no decrease in discoloration when the oxidized, tetravalent stannic tin salt was used in combination with dibutyltin bis(isooctyl thioglycolate). The ingredients were mixed in the same base formulation as examples 9 and 20 and blended and tested at 375° F., as above. The results are set out in table VI, below.

TABLE VI

| | VIIA | VIIB |
|---|---|---|
| | Dibutyltin bis(isooctyl thioglycolate) 1.97 | Dibutyltin bis(isooctyl thioglycolate) 1.94<br>Stannic octoate 0.03 |
| Time (minutes) | | |
| 0 | clear, colorless | clear, colorless |
| 15 | light yellow | light yellow |
| 30 | yellow | yellow |
| 45 | dark yellow | |
| 60 | dark orange | dark orange |
| 75 | dark red | dark red |

Accordingly, stannic salts, where the tin is a $Sn^{+4}$ cation, are not effective in the present combination with the diorganotin mercapto acid esters, showing the criticality of using compounds of tin in different valence states.

Having regard to the foregoing disclosure the following is claimed as the inventive and patentable embodiments thereof:

1. A stabilizer composition for polyvinyl chloride resins comprising (a) at least one tetravalent organotin mercapto carboxylic acid ester composition which has two hydrocarbon groups linked to tin through carbon, selected from the group consisting of alkyl and cycloalkyl groups having from three to about 30 carbon atoms and two organic groups, linked to tin through sulfur or oxygen, at least one of which is an alpha- or beta-mercapto carboxylic acid ester linked to tin through a mercapto sulfur atom and having from three to about 60 carbon atoms, and no more than one of which is the residue of a nonnitrogenous organic compound having an active hydrogen which is attached to oxygen or sulfur and which is replaceable by a metal and (b) a synergizing amount of a divalent stannous tin salt, containing two groups selected from the group consisting of bromide, chloride and organic groups which are the residue of nonnitrogenous organic compounds having an active hydrogen which is attached to oxygen and which is replaceable by a metal.

2. A stabilizer composition in accordance with claim 1 wherein the tin content of the stannous salt is present in an amount of from 0.5 to 15 percent by weight of the tin content of the organotin mercapto carboxylic acid ester composition.

3. A stabilizer composition in accordance with claim 2 wherein the tin content of the stannous salt is present in an amount of from 1 to 8 percent by weight of the tin content of the organotin mercapto carboxylic acid ester composition.

4. A stabilizer composition in accordance with claim 1 wherein the tetravalent organotin mercaptocarboxylic acid ester contains two alkyl groups connected to tin through carbon.

5. A stabilizer composition in accordance with claim 1 wherein the stannous salt is a salt containing non-nitrogenous organic groups selected from the group consisting of alcoholates, phenolates and carboxylates.

6. A stabilizer composition in accordance with claim 5 wherein the organic groups are carboxylates selected from the group consisting of octoate, benzoate, oleate, and stearate.

7. A stabilizer composition in accordance with claim 1 containing in addition a compound selected from the group consisting of alpha- and beta-mercapto carboxylic acids.

8. A stabilizer composition in accordance with claim 1 wherein the organotin mercaptoacid ester composition is a dialkyltin bis(alkyl mercapto carboxylate).

9. A stabilizer composition in accordance with claim 1 wherein the organotin mercapto carboxylic acid ester composition is a compound having the formula:

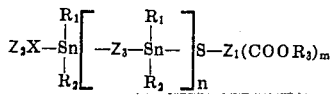

wherein $X-Z_2$ is $S-Z_1-(COOR_3)_m$ or an organic group linked to tin through oxygen or sulfur which is the residue of a compound selected from the group consisting of carboxylic acids, alcohols, phenols and mercaptans; $Z_1$ is a bivalent organic radical having from one to about thirty carbon atoms, $R_3$ is an organic group derived from an alcohol having from one to about four hydroxyl groups and from one to about 30 carbon atoms, $m$ is an integer from one to four, $n$ is a number within the range from zero to five and $R_1$ and $R_2$ are alkyl or cycloalkyl groups having from about one to about 30 carbon atoms bonded to tin through a carbon atom and $Z_3$ is a bivalent radical selected from the group consisting of oxygen and the divalent residue of a dicarboxylic acid, mercaptoacid and mercapto alcohol.

10. A stabilizer composition in accordance with claim 9 wherein $n$ is zero and the organotin mercapto ester has the formula:

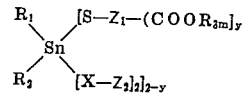

wherein $y$ is one or two.

11. A stabilizer composition in accordance with claim 10 wherein $R_1$, $R_2$ and $R_3$ are alkyl groups, $y$ is two and wherein the stannous salt is the salt of a carboxylic acid.

12. A stabilizer composition in accordance with claim 11 comprising a combination of a dialkyltin bis(alkyl mercaptoacetate) plus a stannous salt selected from the group consisting of chloride, octoate, oleate, stearate, and benzoate.

13. A stabilizer composition in accordance with claim 12 comprising stannous octoate and dibutyltin bis(isooctyl mercaptoacetate).

14. A stabilizer composition in accordance with claim 10 comprising a combination of a dialkyltin bis(alkyl mercaptopropionate) plus a stannous salt selected from the group consisting of chloride, octoate, oleate, stearate, and benzoate.

15. A stabilizer composition in accordance with claim 11 comprising a combination of a dibutyltin bis(isooctyl mercaptopropionate) plus stannous octoate.

16. A stabilizer composition in accordance with claim 11 comprising a combination of a di-n-octyltin bis(isooctyl mercaptoacetate) plus stannous stearate.

17. A polyvinyl chloride resin composition comprising a polyvinyl chloride resin and a stabilizer composition in an amount effective to decrease discoloration of the resin due to heating at 350° F., the stabilizer composition comprising (a) at least one tetravalent organotin mercapto carboxylic acid ester composition which has two hydrocarbon groups linked to tin through carbon, selected from the group consisting of alkyl and cycloalkyl groups having from three to about thirty carbon atoms and two organic groups, linked to tin through sulfur or oxygen, at least one of which is an alpha- or a beta-mercapto carboxylic acid ester linked to tin through a mercapto sulfur atom and having from three to about sixty carbon atoms, and no more than one of which is the residue of a nonnitrogenous organic compound having an active hydrogen, which is attached to oxygen or sulfur and which is replaceable by a metal and (b) a synergizing amount of a divalent stannous tin salt, containing two groups selected from the group consisting of chloride, bromide and organic groups which are the residue of nonnitrogenous organic compounds having an active hydrogen which is attached to oxygen and which is replaceable by a metal.

18. A polyvinyl chloride composition of claim 17 wherein the polyvinyl chloride resin is a homopolymer of vinyl chloride.

19. A polyvinyl chloride composition of claim 17 wherein the stabilizer composition is present in an amount of from 0.25 to 10 percent by weight of the resin.

20. A polyvinyl chloride composition of claim 17 wherein the stannous salt is a salt containing nonnitrogenous organic groups selected from the group consisting of phenolates and carboxylates.

21. A polyvinyl chloride composition of claim 17 where the organotin mercapto carboxylic acid ester composition is a dialkyltin bis(alkyl mercapto carboxylate).

22. A polyvinyl chloride composition of claim 17 wherein the organotin mercapto carboxylic acid ester composition is a compound having the formula:

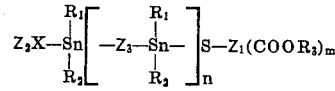

wherein $X-Z_2$ is $S-Z_1-(COOR_3)_m$ or an organic group linked to tin through oxygen or sulfur which is the residue of a compound selected from the group consisting of carboxylic acids, alcohols, phenols and mercaptans; $Z_1$ is a bivalent organic radical having from one to about 30 carbon atoms, $R_3$ is an organic group derived from an alcohol having from one to about four hydroxyl groups and from one to about 30 carbon atoms, $m$ is an integer from one to four, $n$ is a number within the range from zero to five and $R_1$ and $R_2$ are alkyl or cycloalkyl groups having from about one to about thirty carbon atoms bounded to tin through a carbon atom and $Z_3$ is a bivalent radical selected from the group consisting of oxygen and the divalent residue of a dicarboxylic acid, mercaptoacid and mercapto alcohol.

23. A polyvinyl chloride composition in accordance with claim 17 which is a rigid resin composition containing in addition an impact modifier.

24. A stabilizer composition for polyvinyl chloride resins comprising (a) an alpha- or beta-mercaptocarboxylic acid ester having from three to about 60 carbon atoms, (b) a tetravalent organotin compound which has two hydrocarbon groups linked to tin through carbon selected from the group consisting of alkyl and cycloalkyl groups having from three to about thirty carbon atoms, and from one to two groups selected from oxide, carboxylic acid salts and alcoholates, and (c) a synergizing amount of a divalent stannous tin salt containing two groups selected from the group consisting of chloride and organic groups which are the residue of a nonnitrogenous organic compound selected from carboxylic acids, alcohols, and mercaptides having an active hydrogen which is attached to oxygen or sulfur and which is replaceable by a metal, and from one to about twenty carbon atoms.

25. A polyvinyl chloride resin composition comprising a polyvinyl chloride resin and a stabilizer composition in an amount effective to decrease discoloration of the resin due to heating at 350° F, the stabilizer composition comprising (a) and alpha- or beta-mercaptocarboxylic acid ester having from three to about 60 carbon atoms, (b) a tetravalent organotin compound which has two hydrocarbon groups linked to tin through carbon selected from the group consisting of alkyl and cycloalkyl groups having from three to about 30 carbon atoms and from one to two groups selected from oxide, carboxylic acid salts and alcoholates, and (c) a synergizing amount of a divalent stannous tin salt containing two groups selected from the group consisting of chloride and organic groups which are the residue of a nonnitrogenous organic compound selected from carboxylic acids, alcohols, and mercaptides having an active hydrogen which is attached to oxygen or sulfur and which is replaceable by a metal, and from one to about 20 carbon atoms.

* * * * *

UNITED STATES PATENT OFFICE
CERTIFICATE OF CORRECTION

Patent No. 3,627,716  Dated  December 14, 1971

Inventor(s)  Seymour Cohen

It is certified that error appears in the above-identified patent and that said Letters Patent are hereby corrected as shown below:

Column 3, line 13 : After "the" add -- average --

Column 4, lines 48 to 54 :

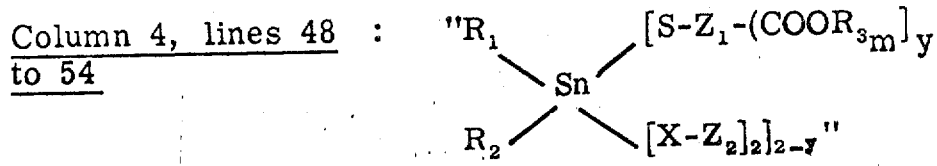

should be

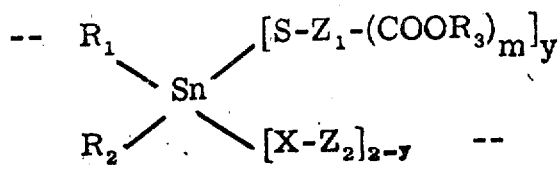

Column 5, lines 43 to 45 :

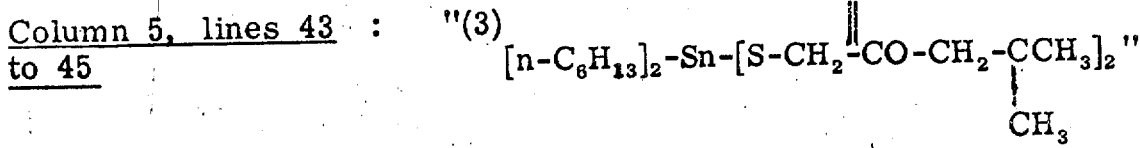

should be

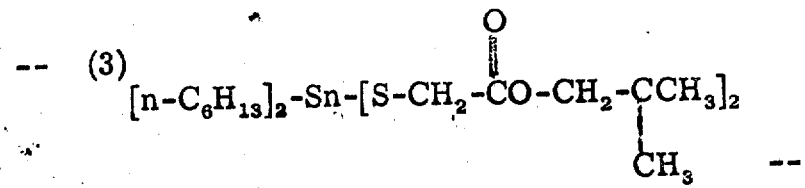

Column 5, lines 58 to 59 : (6)
"$(C_3H_7)_2\text{-Sn}[-S-CH_2-\underset{\underset{O}{\|}}{C}-O-C_8H_{17}\text{-iso}]$"
should be
-- $(C_3H_7)_2\text{-Sn}[-S-CH_2-\underset{\underset{O}{\|}}{C}-O-C_8H_{17}\text{-iso}]_2$ --
Column 6, lines 24 to 29 : (15)
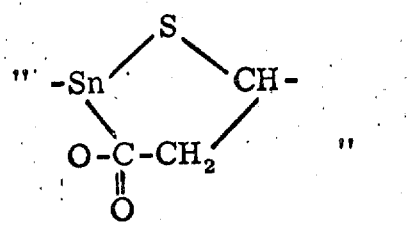
should be
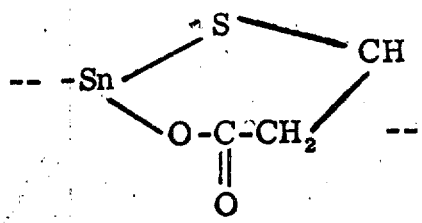

| | | |
|---|---|---|
| Column 7, line 19 | : | "-X-" should be -- $X-Z_2$ -- |
| Column 7, line 66 | : | "icyclic" should be -- icylic -- |
| Column 11, Table I, second column, line 27 | : | "Browm" should be -- Brown -- |
| Column 15, line 32, Table IV, second column heading | : | "thioclycolate)" should be -- thioglycolate -- |
| Column 17, line 66: | : | "Examples 9 and 20" should be -- Examples 9 and 10 --. |
| Column 18, line 31, second column | : | Add -- dark yellow -- |
| Column 19, lines 37 to 40 | : | "$\begin{array}{c} R_1 \\ \diagdown \\ \phantom{R}Sn \\ \diagup \\ R_2 \end{array} \begin{array}{c} [S-Z_1-(COOR_{3m}]_y \\ \\ \\ [X-Z_2]_2]_{2-y} \end{array}$" should be -- $\begin{array}{c} R_1 \\ \diagdown \\ \phantom{R}Sn \\ \diagup \\ R_2 \end{array} \begin{array}{c} [S-Z_1-(COOR_3)_m]_y \\ \\ \\ (X-Z_2)_{2-y} \end{array}$ -- |

Column 20, line 42 : "bounded" should be -- bonded --

*Column 20, line 61 : "mercaptides" should be -- phenols --

Column 20, line 68 : "and" should be -- an --

*Column 21, lines 3 and 4 : "mercaptides" should be -- phenols --

Signed and sealed this 22nd day of May 1973.

(SEAL)
Attest:

EDWARD M. FLETCHER, JR.
Attesting Officer

ROBERT GOTTSCHALK
Commissioner of Patents